(12) United States Patent
Butters et al.

(10) Patent No.: US 7,901,771 B2
(45) Date of Patent: Mar. 8, 2011

(54) REVERSE PHASE HYDROPHILIC POLYMERS AND THEIR USE IN WATER-EXPANDABLE ELASTOMERIC COMPOSITIONS

(75) Inventors: Martin Peter Butters, Bradford (GB); Malcolm Skinner, Bradford (GB); Beatrix Loehner, Bradford (GB); Ian Biggin, Hull (GB)

(73) Assignee: BASF SE, Ludwigshafen (DE)

( * ) Notice: Subject to any disclaimer, the term of this patent is extended or adjusted under 35 U.S.C. 154(b) by 406 days.

(21) Appl. No.: 11/887,980

(22) PCT Filed: Apr. 5, 2006

(86) PCT No.: PCT/EP2006/061319

§ 371 (c)(1),
(2), (4) Date: Oct. 5, 2007

(87) PCT Pub. No.: WO2006/108784

PCT Pub. Date: Oct. 19, 2006

(65) Prior Publication Data

US 2009/0029168 A1     Jan. 29, 2009

(30) Foreign Application Priority Data

Apr. 15, 2005   (EP) .................................. 05102984

(51) Int. Cl.
*B32B 5/66*     (2006.01)

(52) U.S. Cl. ........................ 428/402; 428/403; 428/404; 428/405; 428/406; 428/407; 523/221

(58) Field of Classification Search ......... 428/402–407; 523/221
See application file for complete search history.

(56) References Cited

U.S. PATENT DOCUMENTS

| | | | |
|---|---|---|---|
| 4,532,298 A | 7/1985 | Kimura et al. | 525/96 |
| 4,585,812 A * | 4/1986 | Field | 523/221 |
| 5,444,128 A | 8/1995 | Ichizuka et al. | 524/507 |
| 6,060,164 A | 5/2000 | Green et al. | 428/402 |
| 6,358,580 B1 | 3/2002 | Mang et al. | 428/35.7 |

FOREIGN PATENT DOCUMENTS

| | | | |
|---|---|---|---|
| EP | 0179937 | * | 5/1986 |
| EP | 0 179 937 | | 5/1988 |
| EP | 0 588 286 | | 3/1994 |
| EP | 0 588 288 | | 3/1994 |
| WO | 97/34945 | | 9/1997 |
| WO | 99/35208 | | 7/1999 |
| WO | 00/78888 | | 12/2000 |

\* cited by examiner

*Primary Examiner*—Leszek Kiliman
(74) *Attorney, Agent, or Firm*—Shiela A. Loggins

(57) ABSTRACT

Water-swellable compositions, dispersions and polymer microparticles for their preparation as well as their manufactures and uses are described.

7 Claims, No Drawings

REVERSE PHASE HYDROPHILIC POLYMERS AND THEIR USE IN WATER-EXPANDABLE ELASTOMERIC COMPOSITIONS

The present invention relates to water-swellable compositions, dispersions and polymer microparticles for their preparation.

Water-swellable seals comprising an elastomer component and particulate water-absorbent material being a combination of a polysaccharide and a water-superabsorbent polymer selected from polymers based on methacrylate, acrylate, polymethacrylic acid, polyacrylic acid and salts thereof, polyacrylamide and so forth are known from e.g. U.S. Pat. No. 6,358,580. The water-superabsorbent polymers have an average particle size in the range of from 5 to 800 microns. In one of the suitable superabsorbents only 2.3% by weight of the particles have a particle size of below 50 microns.

Water-sealing sealants used for waterstop materials in the various civil engineering and construction works comprising a water-swelling part and a non-water-swelling part is described e.g. in EP 588,286 A1: as non-water-swelling part vinyl chloride resins, ethylene-vinyl acetate copolymers, polyethylene, polypropylene, EPDM and silicone resins can be chosen, and as water-swelling materials urethane resins, carboxymethyl cellulose, polyvinyl alcohol, sodium polyacrylate and others. In case of vinyl chloride resin, it seems to be preferable to also apply a plasticizer, like a phthalate such as dioctyl phthalate, ditridecylphthalate, or a trimellitate, pyromellitate or an adipate or the like. In the examples only water-swelling urethane resins from unknown sources and particle sizes are disclosed.

U.S. Pat. No. 4,532,298 discloses water-swellable rubber compositions comprising a chloroprene rubber, a highly water-absorptive resin, a rubbery polymer and a metal oxide-based vulcanizing agent. Preferably the high-swelling resin is applied in a powdery form by pulverization to have such a particle size distribution as to pass a screen of 20 mesh opening, which corresponds to 840 microns. It is mentioned that a coarser powder may exhibit unevenness in the expansion when swollen with water or may loose smoothness of the surface.

WO 97/34945 discloses spray dried granules which have a size of at least 90% by weight above 20 microns and which are formed of primary particles, wherein the primary particles have a size at least 90% by weight below 10 microns and are formed of polymer of water soluble ethylenically unsaturated monomer or monomer blend and 5 to 2000 ppm polyethylenically unsaturated cross linking agent, the granules have been formed by spray drying a reverse phase emulsion of the primary polymer particles in the non-aqueous liquid. In particular, primary particles are disclosed, which exhibit a primary particle-size 90% by weight in the range of from 0.5 to 3 microns, which are obtained by reverse phase emulsion polymerization of a mixture comprising 80% by weight dimethylaminoethylacrylate quaternized with methylchloride and 20% by weight acrylamide in the presence of methylene-bis-acrylamide. The granules are used in flocculating or viscosifying compositions, e.g. in the field of sewage sludge treatment, or in the paper-making process. Water-swellable properties are not disclosed, nor the use to manufacture water-swellable compositions.

U.S. Pat. No. 4,585,812 A discloses a composition characterized by a non-aqueous liquid such as oil or xylene containing a dispersion of anhydrous water-swellable polymer particles where 1 part by weight is below 3 microns and 1 to 7 parts by weight (see col. 6, l. 25 to 34) are coarse particles of 10 to 300 microns. Example 1 relates to a non-crosslinked copolymer, in which the particle size before polymerization, i.e. before deoxygenation and addition of initiator, is in the range of 1 to 2 microns. The particle size of the resulting polymerized fine particles is not disclosed. In example 2 another non-crosslinked copolymer is prepared, in which the particle size is below 3 microns, however, it remains unclear, whether the particle size is below 2 microns. The fine particles are not mixed with a water-insoluble thermoplastic polymer. Moreover, the particles are not used for the manufacture of seals.

EP 0 179 937 A1 discloses a water-swelling elastomer three-component composition consisting essentially of a homogenous mixture of an elastomer, a water-absorbent resin and a water-soluble resin, wherein the water-soluble resin is selected from the group of polyethylene oxide, a polyvinylpyrrolidone, a hydroxylethylcellulose, a hydroxyl propylcellulose and a mixture thereof. A disadvantage of this patent application is that in addition to the elastomer two further resins are needed to achieve the desired effects. Another disadvantage is the loss of water-soluble resin when the elastomer is swollen in contact with water, because the dissolved discrete molecules permeate out of the elastomer into the water phase. In a subsequent rehydration step the elastomer results in poorer swelling properties. The water-absorbing resin should have a particle diameter below 400 microns, preferably below 100 microns. However, the lower limit of the particle diameter is not disclosed. Only in example 1a crosslinked product of polysodium acrylate, Aquakeep®4S is mentioned, which exhibits a particle diameter of 70 microns. Other water-absorbent resins are mentioned, too, e.g. in example 3 (Sanwet IM-300) and in example 9 (Sumikagel S-50), however, no particle diameters are given. Furthermore, although EP 0 179 937 mentions on page 5, line 16, that the advantage of finer particle size is that a more homogenous composition is obtained, and a swollen product obtained therefrom becomes homogenous, no teaching is given about the relationship between particle size of the water-swellable resin and swelling performance or retention in the elastomer.

An object for the present invention therefore was to provide water-swellable compositions with an improved swellability and improved retention of the water-swelling polymer particles. Furthermore, dispersions as well as polymer microparticles, e.g. in powder form, for the manufacture of such water-swellable compositions are additional objects. In addition, a microparticle, a dispersion containing microparticles, and a water-swellable composition containing microparticles should be provided, which do not contain a third polymeric resin.

Therefore, the present invention is directed to a water-swellable composition obtainable by combining a non-water-swelling thermoplastic or elastomeric polymer and a water-swelling material, which comprises (a) from 5 to 70, preferably 10 to 60, most preferably from 15 to 50% by weight of hydrophilic polymer microparticles, (b) from 30 to 95, preferably 40 to 90, most preferably from 50 to 85% by weight of a water-insoluble thermoplastic polymer, resin or elastomeric material, wherein the hydrophilic polymer microparticles have a particle volume mean diameter of not more than 2 microns (as determined by laser diffraction technique using a Sympatec Helos H1539 with R1 lens and Quixel dispersion system).

The hydrophilic polymer microparticles can be prepared according to the methods described below, i.e. preferably a dispersion is prepared as described below. Usually this dispersion is used for the preparation of the inventive water-swellable composition or the hydrophilic polymer microparticles are separated from the dispersion (as described later) and used to prepare the inventive water-swellable composition.

The particle volume mean diameter is described later in more detail.

The thermoplastic polymer, resin or elastomeric material that can be used usually is one that has elastomeric or rubber-like properties or one that gains elastomeric properties using a suitable plasticizer such as polyethylene-co-vinyl acetate, polyvinyl butyral resin, PVC (polyvinyl chloride), polystyrene, polyacrylics, polyamides, rubbers such as natural rubber, NBR (nitrile-butadiene rubber), SBR (styrene-butadiene rubber), polybutenes, polybutadienes, polyisoprenes, polyisobutylene-isoprene, fluororubber, chloro-sulphonated polyethylene, silicone, polychloroprene, butyl rubbers, EPDM (ethylene-propylene-diene rubber), EPR (ethylene-propylene rubber) and polystyrene-co-isobutylene and resins such as alkyd resins, phenolic resins, aminoplast resins, polyurethane resins, polysulfide rubbers, and acrylic resins. Preferably it will be one where a substantial amount of plasticizer fluid is commonly used to make an elastomeric composition such as PVC and NBR. For reverse phase dispersions the most preferable materials are PVC and NBR, in case a carrier-free powder product is desired, then plasticized as well as non-plasticized elastomers, preferably PVC and elastomeric rubbers are preferred.

The inventive water-swellable compositions can be prepared by using conventional processes. E.g. the components, including the water-insoluble thermoplastic polymer, resin or elastomeric material, the hydrophilic polymer, as dispersion or as powder, and optional additives as desired can be pre-mixed using a high-shear mixer such as a Banbury mixer. Such high-shear mixing usually generates heat that will soften the base thermoplastic polymer, resin or elastomeric material and promote the dispersion of microparticulate hydrophilic polymer throughout the mixture. Compositions involving thermoplastic polymers such as PVC preferably are further processed into a sheet or shaped article by extrusion, injection moulding or another thermal technique. Rubbers may be processed similarly and are usually cured or vulcanized during this second step at high temperature through the action of a suitable curing or vulcanization aid.

Therefore, another embodiment of this invention is related to a process for the manufacture of the inventive compositions, wherein 5 to 70% by weight of hydrophilic microparticles and 30 to 95% by weight of water-insoluble thermoplastic polymer, resin or elastomeric material are admixed.

A preferred embodiment of this invention concerns the inventive composition, which contains as further component an additive (c). Examples of additives include e.g. lubricants, process oils, antistatic agents such as glycerol monostearate and glycerol monooleate, ethoxylated alcohol as an antistatic agent and/or fluidizing agent for PVC plastisols, flame retardant, vulcanization accelerators, vulcanization aids, aging retarders, colouring agents such as pigments and dyes, wetting agents, acid scavengers, heat stabilizers, defoamers, blowing agents, fillers such as calcium carbonate, carbon black, clay, silica and additional plasticizers in addition to the plasticizer introduced due to its presence as the carrier fluid of the hydrophilic polymer microparticle.

Such additives (c) can be added in amounts depending on the desired effect, which can easily be determined by a person skilled in the art. Usually the additives are added in amounts in the range of from 1 to 50% by weight, based on the total amount of the composition.

Therefore, a preferred embodiment is directed to the instant composition further comprising an additive (c), wherein the additive (c) is a lubricant, process oil, antistatic agent, ethoxylated alcohol, flame retardant, vulcanization accelerator, vulcanization aid, aging retarder, colouring agent such as a pigment or a dye, a wetting agent, an acid scavenger, a heat stabilizer, a defoamer, a blowing agent, a filler such as calcium carbonate, carbon black, clay, silica, or an additional plasticizer in addition to the plasticizer introduced due to its presence as the carrier fluid of the hydrophilic polymer microparticle.

In another preferred embodiment a further component (d) is added to the inventive composition, either with or without additive (c) in amounts in the range of from 0 to 20% by weight, based on the total amount of the composition. Component (d) usually has the function of a second hydrophilic material such as finely divided sodium or calcium bentonite or silica. Such materials may be used to contribute directly to the expansion of the elastomeric composition or to help transport water to the microparticulate hydrophilic polymer. The use of such materials may be beneficial in the preparation of a waterstop strip optimised in terms of swelling capacity, swelling rate and cost (due to the low cost of hydrophilic minerals), for example.

A further preferred embodiment of this invention relates to the use of the inventive water-swellable compositions as sealant materials for example as waterstops for non-moving construction joints. Generally, the waterstops preferably are in the form of a flexible strip, which usually contain from 10 to 60, preferably 15 to 50% by weight of the hydrophilic polymer microparticles (dry basis) and 20 to 70, preferably 30 to 60% by weight of water-insoluble thermoplastic polymer, resin or elastomeric material, the rest, which sums up to 100% by weight usually consists of process aids and additives, which in PVC can contain a high proportion, up to 50% by weight, of one or more plasticizers.

Furthermore, the inventive water-swellable compositions can be in the form of coatings, films, fibres, yarns, fabrics, foams, strips, cords and other flexible shaped articles as well as less flexible shaped articles.

Hence, another embodiment of the instant invention concerns flexible shaped articles such as coatings, films, fibres, yarns, fabrics, foams, strips, and cords.

In addition, the inventive water-swellable compositions are useful for the manufacture of e.g.

Articles for absorbing free unwanted water or water-based liquids such as spillage mats Water-absorbent fibres, yarns or fabrics or textiles for mopping up water or water-based liquids e.g. household applications and applications such as wrappings for cable bundles to protect against water ingress Articles such as absorbent fibres, fabrics, films and membranes for use as components of wound dressings to confer greater absorptivity and/or breathability and/or moisture transfer properties as well as dressing adhesive, which would have the ability to wick water or moisture away from the skin Articles for removing moisture from air to treat moist, humid environments Water-swelling seals e.g. waterstops for construction joints, as well as rubber water-swelling oil drilling seals Water-swelling mastics, caulks or sealants Water swelling coatings or layers attached to, or used in conjunction with, water-resistant membranes, layers or coatings etc; such systems could be used, for example, to provide protection from water ingress should the membrane or coating suffer damage, i.e. the system is "self-healing"

Moisture vapour permeable films, membranes & coatings e.g. pervaporation membranes, plastisol coated wallcoverings e.g. vinyl wallcoverings, including wallcoverings obtained by laminating a coating or film onto the base paper e.g. using a calendering process Adhesives, coatings, mastics, caulks, sealants or films that have the ability to transmit water or water vapour Printing rollers with more hydrophilic properties, such that polar fountain solutions have greater affinity for the rollers In addition, the present invention is also directed to a dispersion comprising
(a) from 30 to 75, preferably from 40 to 75% by weight of hydrophilic polymer microparticles, which are obtainable by a reverse phase polymerization of monomers selected from the group consisting of
(aa) water-soluble, ethylenically monounsaturated polar nonionic monomers,
(ab) water-soluble, ethylenically monounsaturated anionic monomers, and
(ac) water-soluble, ethylenically monounsaturated cationic monomers, in the presence of a crosslinker, wherein the hydrophilic polymer microparticles have a volume mean diameter of less than 2 microns (as determined by laser diffraction technique using a Sympatec Helos H1539 with R1 lens and Quixel dispersion system),
(b) from 25 to 70, preferably from 25 to 60% by weight of a water-immiscible carrier fluid.

Preferably the dispersion comprises
(a) from 30 to 75, preferably from 40 to 75% by weight of hydrophilic polymer microparticles, which are obtainable by a reverse phase polymerization of monomers selected from the group consisting of
(aa) water-soluble, ethylenically monounsaturated polar nonionic monomers,
(ab) water-soluble, ethylenically monounsaturated anionic monomers, and
(ac) water-soluble, ethylenically monounsaturated cationic monomers, in the presence of a crosslinker, wherein the hydrophilic polymer microparticles have a volume mean diameter of less than 2 microns (as determined by laser diffraction technique using a Sympatec Helos H1539 with R1 lens and Quixel dispersion system),
(b) from 25 to 69.5, preferably from 25 to 58.5% by weight of a water-immiscible carrier fluid,
(c) from 0.5 to 25%, preferably 1.5 to 15% by weight of other components as desired such as primary emulsifier, stabilizing polymer and activator, wherein the total amount of components (a), (b) and (c) adds up to 100% by weight.

As water-soluble, ethylenically monounsaturated polar nonionic monomers the following monomers can be chosen: acrylamide, methacrylamide, N,N-di($C_1$-$C_8$alkyl)acrylamide such as N,N-dimethylacrylamide, vinyl alcohol, vinyl acetate, allyl alcohol, hydroxyethyl methacrylate, or acrylonitrile.

As water-soluble, ethylenically monounsaturated anionic monomers the following monomers can be chosen: water-soluble, ethylenically monounsaturated anionic monomers containing acidic groups selected from carboxylic group, sulphonic group, phosphonic group, and the corresponding salts, preferably monomers such as acrylic acid, methacrylic acid, maleic acid, maleic anhydride, fumaric acid, itaconic acid, 2-acrylamido-2-methylpropanesulphonic acid, allyl sulphonic acid, vinyl sulphonic acid, allyl phosphonic acid, and vinyl phosphonic acid can be chosen.

As water-soluble, ethylenically monounsaturated cationic monomers the following monomers can be chosen: N,N-di-$C_1$-$C_8$alkylamino-$C_1$-$C_8$alkylacrylate such as N,N-dimethyl amino ethyl acrylate, N,N-di-$C_1$-$C_8$alkylamino-$C_1$-$C_8$alkylmethacrylate such as N,N-dimethyl amino ethyl methacrylate, including quaternised forms e.g. methyl chloride quaternised forms, diallyldimethyl ammonium chloride, N,N-di-$C_1$-$C_8$alkylamino-$C_1$-$C_8$alkylacrylamide and the quaternised equivalents such as acrylamidopropyl trimethyl ammonium chloride.

$C_1$-$C_8$alkyl usually stands for methyl, ethyl, n-, i-propyl, n-, i-, sec.- or tert. butyl, n-pentyl, n-hexyl, n-heptyl, n-octyl, or 2-ethyl-hexyl.

In general, the amounts of monomers are chosen in the ranges of:
(aa) 0 to 80% by weight (polar and nonionic),
(ab) 20 to 100% by weight (anionic),
(ac) 20 to 100% by weight (cationic), wherein the total amount sums up to 100% by weight.

In a preferred embodiment of the instant invention the total amount of the water-soluble anionic and cationic monomers is chosen in the range of from 40 to 100, preferably from 50 to 100% by weight and the amount of water-soluble polar nonionic monomers is chosen in the range of 60 to 0, preferably from 50 to 0% by weight, more preferably the polymer is not amphoteric, i.e. either anionic or anionic and polar nonionic monomers, or cationic or cationic and polar nonionic monomers are chosen, or if anionic and cationic monomers are chosen (with or without polar nonionic monomers), then usually either one is in excess of the other one.

In another preferred embodiment the amount of anionic monomers is chosen in the range of from 40 to 100%, preferably from 50 to 100% by weight and the weight of nonionic polar monomers is chosen from 60 to 0, preferably from 50 to 0% by weight. Most preferably the anionic monomer is acrylic acid or a water-soluble salt thereof.

In case the copolymers contain both anionic and cationic groups, with or without polar groups, then the preferred molar ratio of anionic monomers to cationic monomers is chosen in the range of from 3:1 to 20:1, or the molar ratio of cationic monomers to anionic monomers is chosen in the range of from 3.1 to 20:1.

In a preferred embodiment of this invention concerning hydrophilic polymer microparticles, which are obtained from the above mentioned monomers, and wherein the amount of anionic monomers is not zero, in which the acid groups are partially or fully neutralized. Preferably the degree of neutralization is chosen in the range of from 50 to 100%, more preferably from 75 to 100% (on a molar basis). The neutralization can be carried out by known methods such as applying bases to the corresponding acidic groups carrying hydrophilic polymer microparticles. The usual, most convenient practice is to neutralize the monomers prior to carrying out the polymerization reaction. Such bases suitable for neutralizing the acidic monomers can be e.g. alkali metal hydroxides such as NaOH or KOH as well as ammonia or amines such as mono-, di- or tri-ethanolamine, most preferably NaOH is chosen. In some cases it can be beneficial to neutralize up to 50% of the acid groups (on a molar basis) in the form of di-, tri- or polyvalent cationic salts such as polyamine salt or alkali earth metal salt such as $Mg(OH)_2$, $Ca(OH)_2$ or $Ba(OH)_2$ as a means of controlling the degree and/or rate of swelling.

Preferably the hydrophilic polymer microparticles are crosslinked. Cross-linking can be achieved in a number of ways, which will be clear to those skilled in the art. For example, di- or polyvalent metal ions can be used to confer a degree of cross-linking to polymers containing acid groups, particularly carboxylic acid groups. Other compounds such as di- or polyamines can be used in a similar way. Furthermore, water-soluble organic substances, which are able to react with groups on the hydrophilic polymer microparticle, can also be used, such as polyvalent epoxy compounds. Preferably, cross-linking is achieved through the use of a suitable water-soluble (or monomer phase soluble) di-, tri- or polyunsaturated polymerizable monomer, which usually is present in the aqueous monomer solution. Suitable cross-linking monomers include e.g. methylenebisacrylamide, diacrylamidoacetic acid, polyol(meth)acrylates such as pentaerythritol tri(meth)acrylate or ethyleneglycoldi(meth)acrylate and tetraallyl ammonium chloride. Preferably an amount of cross-linking monomer is chosen to give a polymer, which is water-insoluble and water-swelling and/or water or moisture transmittable, whilst avoiding excessive structuring, which would restrict the water-absorbency or water/moisture transmittance of the hydrophilic polymer microparticle and the inventive composition comprising such polymer microparticles or dispersions thereof.

The desired level of cross-linking monomer usually depends on the chain length (or molecular weight) of the polymer chain segments of the cross-linked polymer. For example it is possible to control the chain length of the hydrophilic polymer microparticle using a chain-transfer reagent, which tends to give shorter chains. The use of certain low reactivity monomers may also give shorter chains. The chain length can also be controlled to some degree by the choice and amount of initiator used for the polymerization. Where conditions are used that would be expected to give shorter chain lengths, higher levels of cross-linking monomer may be used to give the appropriate degree of structuring of the cross-linked hydrophilic microparticle. In general, a suitable level of cross-linking monomer can be chosen in the range of 5 to 2000 ppm, preferably from 5 ppm to 500 ppm and most preferably from 5 to 100 ppm based on weight of the chosen monounsaturated monomers.

Preferably the inventive dispersions are obtainable by reverse phase polymerization, i.e. a technique that is well known established in the prior art, for example described and discussed in WO 97/34945. In the instant invention, usually an aqueous monomer phase is prepared comprising the chosen monomers and water. If desired optionally a small amount of a complexing agent such as EDTA to scavenge any free metal ions that otherwise may adversely interfere with the polymerization reaction. In addition, a carrier or oil phase is prepared containing a plasticizer, for example di-isodecyl phthalate, a volatile oil such as a mixture of hydrocarbons, a primary emulsifier and optionally a polymeric stabiliser. The monomer and oil phases are mixed together using a suitable homogeniser, such as a Silverson homogeniser or high-pressure homogeniser, to form a fine and stable emulsion of the aqueous monomer in the carrier phase. The polymerization of this homogenized, unpolymerised emulsion is then preferably initiated with a suitable initiator such as a redox couple and/or thermal and/or photo initiator. After the polymerization step water and the volatile oil are then removed from the emulsion/dispersion e.g. by distillation.

Further complexing agents can be homologues of EDTA such as diethylene triamine pentaacetic acid or methylene phosphonate complexing agents such as diethylene-triamine-pentamethylene phosphonate.

The complexing agent is usually applied in a range of from 0.01 to 0.5% by weight based on the weight of monomers.

Therefore, another embodiment of the instant invention concerns a process for the manufacture of the instant dispersions, which comprises (I) admixing monomers selected from the group consisting of
(aa) water-soluble, ethylenically monounsaturated polar nonionic monomers
(ab) water-soluble, ethylenically monounsaturated anionic monomers and
(ac) water-soluble, ethylenically monounsaturated cationic monomers, a crosslinker, water, an initiator, a water-immiscible carrier fluid, volatile oil, emulsifier, and optionally further additives such as a complexing agent and polymeric stabiliser (II) carrying out a reverse phase polymerization, (III) removing water and volatile oil, wherein the thus obtained hydrophilic polymer microparticles have a volume mean diameter of not more than 2 microns (as determined by laser diffraction technique using a Sympatec Helos H1539 with R1 lens and Quixel dispersion system).

Generally, the hydrophilic polymer microparticles have a volume mean diameter (VMD) of not more than 2 microns, preferably not more than 1 micron, more preferably not more than 0.8 microns, most preferably in the range of from 0.3 to 0.8 microns, wherein the VMD is determined by laser diffraction technique using a Sympatec Helos H1539 with R1 lens and Quixel dispersion system.

A person skilled in the art usually knows several ways to control particle-size. One way e.g. is through the selection and amount of the primary emulsifier for the aqueous monomer-in-oil emulsion. Usually the primary emulsifier has an HLB in the range 1 to 5. An example of a primary emulsifier is sorbitan mono-oleate (e.g. SPAN 80®, CAS 1338-43-8, HLB 4.3). The amount of primary emulsifier required to achieve the desired particle-size is generally in the range of 0.5 to 15% by weight on the weight of the aqueous monomer phase, but is dependant on a number of factors such as homogenization equipment and conditions, the nature of the aqueous phase and oil phase as well as the emulsifier itself, as there are numerous emulsifiers to select from. Usually the amount of primary emulsifier will be in the range of 1 to 10%, most preferably from 2 to 5%.

As a rule, the water-immiscible carrier fluid ("carrier") comprises a plasticizer, which is a low viscosity oily fluid conventionally used as an additive in plastics, rubbers and generally in the preparation of elastomeric materials. Preferably the carrier will be a plasticizer, which may be used in combination with another compatible oily fluid that is an additive of elastomeric compositions such as process oil or lubricant.

Generally, the carrier is chosen to be low in viscosity in order to facilitate the preparation of reverse phase dispersions containing a maximum concentration of hydrophilic polymer.

Preferably the carrier is non-toxic and non-polluting. Suitable carriers are usually inert and as such will not adversely interfere with the polymerization reaction during the preparation of the hydrophilic polymer microparticles. Preferable carriers include, but are in no way restricted to, alkyl esters of aliphatic dicarboxylic acids such as adipic acid $C_1$-$C_{10}$ alkyl esters including diethyl adipate, dibutyl adipate, dipropyl adipate, dihexyl adipate, dioctyl adipate and di-isononyl adipate, pimelic acid esters, suberic acid esters, azelaic acid esters, sebacic acid esters and esters of higher molecular weight aliphatic dicarboxylic acids, alkyl esters of aliphatic tricarboxylic acids such as citric acid esters including tributyl citrate, acetyltributyl citrate, acetyltriethyl citrate, acetyltrihexyl citrate and butyryltrihexyl citrate and trimetallic acid esters such as trioctyl trimellitate, $C_8$-$C_{20}$ alkyl esters of phthalic acid including di-isononylphthalate, di-isodecylphthalate and di-undecylphthalate, liquid polyester plasticisers, and mixtures thereof. Most preferred are esters of aliphatic dicarboxylic acids, in particular $C_1$-$C_{10}$alkyl esters of aliphatic $C_2$-$C_{10}$ alkyl di- and tricarboxylic acids and $C_8$-$C_{20}$ alkyl esters of phthalic acid.

Wherein $C_8$-$C_{20}$ alkyl stands for e.g. n-octyl, 2-ethyl-hexyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl.

$C_1$-$C_{10}$alkyl stands for e.g. methyl, ethyl, n-, i-propyl, n-, i-, sec.- or tert. butyl, n-pentyl, n-hexyl, n-heptyl, n-octyl, 2-ethyl-hexyl, n-nonyl, n-decyl.

$C_2$-$C_{10}$ alkyl stands for e.g. ethyl, n-, i-propyl, n-, i-, sec.- or tert. butyl, n-pentyl, n-hexyl, n-heptyl, n-octyl, 2-ethyl-hexyl, n-nonyl, n-decyl.

Another preferred embodiment of the instant invention relates to the inventive dispersions, which comprise a further component (c), i.e. a stabilizing amphiphilic copolymer, which leads to an improved thermal and/or shear stability. The preparation of the reverse phase dispersions of the hydrophilic polymer microparticles of this invention preferably involves a step whereby the water-containing precursor to the final dispersion product undergoes a water or water/solvent azeotrope removal step by vacuum distillation or flash distillation or other thermal methods. It cannot be excluded that the dispersion is destabilized by this removal step, especially when the aim is to achieve a high concentration of disperse phase particles in the final dispersion product, and when the removal step comprises flash distillation such as thin film evaporation. For this reason it is advantageous to add a stabilizing amphiphilic copolymer. In addition, it has been found, too, that the stabilizing amphilpilic copolymer also allows obtaining a higher concentration of disperse phase in the final product than would otherwise be possible.

Suitable stabilizing amphiphilic copolymers usually contain both hydrophobic and hydrophilic groups in the same copolymer. Preferred amphiphilic stabilizing copolymers are obtainable by polymerizing from 50 to 90% by weight of one or more water-immiscible alkyl (meth)acrylates monomers and from 10 to 50% by weight of one or more acidic, basic or quaternary amine monomers.

Preferred alkyl (meth)acrylates are $C_1$-$C_{20}$alkyl esters of acrylic acid or methacrylic acid, preferably mixtures thereof containing at least 20% by weight (on total monomer weight) of one or more $C_{12}$-$C_{20}$alkyl esters of acrylic acid or methacrylic acid.

$C_1$-$C_{20}$alkyl stands for e.g methyl, ethyl, n-, i-propyl, n-, i-, sec.- or tert. butyl, n-pentyl, n-hexyl, n-heptyl, n-octyl, 2-ethyl-hexyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-eicosyl.

$C_{12}$-$C_{20}$alkyl stands for e.g. n-dodecyl, n-tridecyl, n-tetradecyl, n-pentadecyl, n-hexadecyl, n-heptadecyl, n-octadecyl, n-nonadecyl, n-eicosyl.

Preferred acidic monomers are acrylic acid and methacrylic acid.

Examples of basic monomers are N,N-di-$C_1$-$C_8$alkylamino-$C_1$-$C_8$alkylacrylate such as N,N-dimethyl amino ethyl acrylate, N,N-di-$C_1$-$C_8$alkylamino-$C_1$-$C_8$alkylmethacrylate such as N,N-dimethyl amino ethyl methacrylate, or N,N-di-$C_1$-$C_8$alkylamino-$C_1$-$C_8$alkylacrylamide.

Particularly preferred stabilizing amphiphilic copolymers are prepared by polymerizing 0 to 25% by weight of one or more $C_1$-$C_{10}$alkyl esters of acrylic or methacrylic acid, 25% to 90% by weight of one or more $C_1$-$C_{10}$alkyl esters of acrylic acid or methacrylic acid and 10% to 25% by weight of acrylic acid or methacrylic acid.

Such stabilizers are known in the prior art or can be manufactured by known methods. An example of a commercially available stabilizer is e.g. Hypermer™ (supplied by Uniqema).

The stabilizing amphiphilic copolymers can be prepared e.g. by free radical polymerization of the monomers dissolved in a suitable low viscosity oily fluid. Preferably the oily fluid is one that is used in the preparation of the reverse phase dispersion product e.g. it may be a volatile oil such as Exxsol D40 or a plasticizer of the reverse phase dispersion product. Oil soluble thermal initiators can be employed to induce polymerization of the monomers.

The stabilizing amphiphilic copolymer usually is added in amounts of from 0 to 10, preferably 0.5 to 5% by weight based on the total amount of aqueous monomer phase.

Another preferred embodiment of the instant invention relates to a high concentrated form of the inventive dispersion. It is has been found, that it is advantageous for the concentration of hydrophilic polymer in the final reverse phase dispersion to be as high as possible as this is beneficial to productivity, storage and formulation flexibility when used in the inventive water-swellable compositions. In general, the viscosity of the inventive dispersion increases as the hydrophilic polymer microparticle concentration increases. However, a dispersion that is very high in viscosity usually is difficult to handle and to process when preparing the inventive water-swellable compositions. According to present observations, when the viscosity is too low, problems may arise due to settlement or sedimentation of the hydrophilic polymer microparticle. Therefore a need existed to tailor the viscosity (and hence concentration) in order to provide the maximum possible concentration of hydrophilic polymer microparticle in the inventive dispersion that is suitably fluid and handleable.

Preferably the viscosity of the inventive dispersion is chosen in the range of from 100 cP to 10000, more preferably from 500 cP to 5000 cP at 25° C. using a Brookfield RVT viscometer with spindle 3 at a rotational speed of 10 rpm to 50 rpm, usually 20 rpm is found to be satisfactory.

Therefore, a preferred embodiment relates to dispersions comprising a stabilizing amphiphilic copolymer, in which the concentration of hydrophilic polymer microparticles is at least 30%, preferably at least 40% and most preferably at least 45 up to 75% by weight of the finished dispersion.

Another preferred embodiment of the instant invention relates to the instant dispersions, which contain as additional component (d) an oil-in-water-emulsifier, which is sometimes also called an "activator". Preferably an activator is chosen, which has a hydrophilic-lipophilic balance (HLB) value in the range of 9 to 20 depending on the nature of the carrier phase. Examples of such activators are e.g. alkyl phenol ethoxylates such as nonyl phenol ethoxylate, or alkyl alcohol ethoxylates such as linear $C_{12}$-$C_{14}$ alkyl alcohol 7 mole ethoxylate.

In general, when the oil-based dispersion is mixed with water, the effect of the activator is to emulsify the oily carrier fluid into the water phase, releasing the hydrophilic polymer microparticle to dissolve in the water phase. This usually causes the water phase to increase in viscosity due to the dissolution or swelling of the hydrophilic polymer microparticle. The rate of activation, or hydrophilic polymer microparticle dissolution or swelling, generally can be controlled by the nature and concentration of activator. In a preferred embodiment, from 3 to 8% by weight of activator (based on the weight of the dispersion) is chosen. However, it has been found that the dispersion of this invention does not benefit from the addition of an activator for its intended use in preparing the inventive water-swellable compositions.

Still another preferred embodiment of the instant invention relates to inventive dispersions comprising as further component (e) an active ingredient. Preferably the active ingredient is a water-soluble or dispersible compound or composition that is insoluble in the carrier fluid of the dispersion. In this case the active ingredient preferably is present in the hydrophilic polymer microparticles.

Up to now two main methods are generally known to form a reverse phase dispersion of hydrophilic polymer microparticles containing a water-soluble or water-dispersible active ingredient. One method involves adding an aqueous solution or dispersion of the active ingredient to the reverse phase hydrophilic polymer microparticle dispersion, in which case the active ingredient is absorbed into the hydrophilic polymer microparticles. The resulting product can be the final product or water (introduced with the active ingredient) may be removed by e.g. vacuum distillation to give the final product.

Another method involves carrying out the reverse phase polymerization in the presence of the active ingredient, i.e. the active ingredient is dissolved or dispersed in the aqueous monomer solution prior to commencing the polymerization. In this case, the active ingredient preferably is not adversely affected by components of the aqueous monomer phase or polymerization additives nor should the active ingredient adversely affect the polymerization reaction. The latter incorporation method is preferred for convenience.

E.g an active ingredient can be a protective agent such as protecting against UV degradation, thermal degradation, biological fouling, fungal problems etc., or it can be a fragrance, pesticide, herbicide, antistatic agent, fire retarding agent etc.

In case the active ingredient is an antibacterial agent, it is usually used to protect the hydrophilic polymer and other additives of the inventive composition against detrimental bacterial activity during use of the inventive composition.

In general, the amount of the active ingredient depends on the desired effect, and, hence, can be easily determined by a person skilled in the art.

It is often advantageous that the carrier fluid of the reverse phase dispersion is removed so that the hydrophilic polymer microparticles are substantially free of carrier fluid and are therefore in a powder or granular form, which possibly may contain residues of the carrier fluid.

Therefore, the present invention is also directed to a polymer microparticle, which usually is obtainable by a reverse phase polymerization of
(aa) water-soluble, ethylenically monounsaturated polar nonionic monomers and
(ab) water-soluble, ethylenically monounsaturated anionic monomers, in the presence of a crosslinker, wherein the polymer microparticles have a volume mean diameter of not more than 2 micron (as determined by laser diffraction technique using a Sympatec Helos H1539 with R1 lens and Quixel dispersion system).

The description of the polymerization as well as the monomers and crosslinker etc. are the same as for the description of the inventive dispersions.

As far as the preparation of the inventive polymer microparticles are concerned, generally in a first step an inventive dispersion as described above is prepared, then the carrier fluid is separated by known methods e.g. by spray-drying, filtration, e.g. microfiltration, or solvent-induced solid/liquid separation, e.g. precipitation by the addition of a solvent, in which the polymer microparticles are not or only to some extent soluble.

Therefore, another embodiment of this invention relates to a process for the manufacture of the instant polymer microparticle, which comprises separating the water-immiscible carrier fluid from the instant dispersions.

The inventive polymer microparticles, which are preferably hydrophilic, usually are obtained in the form of agglomerates of primary particles that can be largely deagglomerated by the shear forces involved in preparing elastomeric compositions, or by the deliberate inclusion of a comminution step or by deliberately using more intensive processing conditions to achieve the necessary deagglomeration. Preferably the primary particles are weakly agglomerated so that deagglomeration is achieved without resorting to exceptional process conditions. It is advantageous that the particles are weakly agglomerated to avoid or minimize the respiratory hazard that would attend dry powder composed substantially of primary particles with a volume mean diameter of 2 microns or below.

Another embodiment of the instant invention relates to the use of the inventive composition for the manufacture of seals, in particular swellable waterstops.

Another embodiment of the instant invention relates to the use of the inventive dispersion for the manufacture of the inventive compositions and polymer microparticles, and seals, in particular swellable waterstops.

Another embodiment of the instant invention relates to the use of the inventive polymer microparticle for the manufacture of the inventive compositions, and seal, in particular swellable waterstops.

A further embodiment of the instant invention concerns a swellable waterstop, in particular a PVC or rubber waterstop, as well as a water-stops for non-moving construction joints comprising the inventive compositions, dispersions or the polymer microparticles.

A further embodiment of the instant invention relates to seals comprising the inventive compositions, dispersions or polymer microparticles.

The manufacture of water-stops and seals can be carried out by known methods, which e.g. are described in WO 00/78888, WO 99/35208, EP 588 286, EP 588 288, EP 179 937 or U.S. Pat. No. 4,532,298.

The inventive water-swellable compositions usually absorb at least 25% by weight of water based on the original weight of the elastomeric composition, preferably at least 50% and most preferably at least 100%, in tests using demineralized water.

The provision of hydrophilic polymer microparticles in a substantially dry, carrier-free form leads to a number of advantages. Firstly, it is possible that a single product (substantially carrier-free hydrophilic polymer) could replace several products all with different carrier fluids for particular elastomeric compositions. It is advantageous for a manufacturer of hydrophilic polymer microparticles to minimise the variety of products in order to save costs of downtime that would otherwise arise from switching between the manufacture of one product type to another, and also to minimise raw material (i.e. carrier fluid) inventory and finished product inventory. It is advantageous to supply the hydrophilic polymer microparticles in as concentrated a form as possible to save transportation costs. A significant advantage is the ability to produce inventive water-expandable elastomeric compositions using elastomeric materials that do not benefit from (or indeed are adversely affected by) the addition of large amounts of an oily fluid. Thus it is advantageous to use hydrophilic polymer microparticles that are substantially carrier-free to prepare inventive elastomeric compositions using elastomeric materials that do not benefit from the addition of plasticizer or other oily fluid in amounts above 30% by weight, preferably above 20% by weight and most preferably above 10% by weight of the final elastomeric composition. This applies to rubbers for example, where the incorporation of a reverse phase dispersion would unnecessarily add an oily fluid (the carrier fluid of the reverse phase dispersion) to the rubber composition. In many cases the addition of a lot of oily fluid will have a negative effect in terms of weakening the rubber composition or by adversely affecting other mechanical properties of the composition so produced. This problem can be overcome by using hydrophilic polymer microparticles that are substantially carrier-free.

EXAMPLES

Example 1

An aqueous monomer phase is prepared from acrylamide (83.7 g), acrylic acid (34.6 g), sodium hydroxide (19.2 g), water (138.9 g), EDTA solution (40% in water) (0.4 g), and methylene bisacrylamide (0.1% solution in water) (3.2 g). An oil (carrier) phase is prepared from di-isodecyl phthalate (166.7 g), 108.8 g of a mixture of dearomatized aliphatic hydrocarbons (having a distillation range from 164 to 192° C., and a density of 0.772 g/cm$^3$; sold by ExxonMobil under the trademark EXXSOL™ D40), 8.4 g of (Z)-mono-9-octadecenoate sorbitan (SPAN 80®, CAS Registry No. 1338-43-8), and a thermal stabiliser (based on a stearyl methacrylate/methacrylic acid copolymer in the form of a solution in EXXSOL™ D40 at a concentration of 23% by weight) (12.2 g). The monomer and oil phases are mixed together using a Silverson Homogeniser for three minutes. This unpolymerised emulsion is transferred to a 1-liter reaction flask fitted with nitrogen inlet, stirrer and initiator feed inlets. A nitrogen purge is applied for 30 minutes and a nitrogen blanket is maintained thereafter. The temperature of the unpolymerised emulsion is adjusted to 20° C. Polymerisation is initiated by the addition of both t-butyl hydroperoxide and sodium metabisulphite. The polymerisation is allowed to free rise to approximately 85° C. over an hour. Water and Exxsol D40 are then removed from the emulsion/dispersion by vacuum distillation using a rotary evaporator at 100° C. Ethylan 55 from Akzo Nobel, believed to be 5.5 mole nonyl phenol ethoxylate, is added at a rate of 5 g Ethylan 55 per 100 g of distilled dispersion.

The final product—hereafter called Product A—has a viscosity of 900 cP (Brookfield Viscometer using spindle 3 at 20 rpm) and an average particle size, expressed as the Volume Mean Diameter (VMD) of 0.70 microns as determined by analysis using a Sympatec Helos H1539 with R1 lens and Quixel dispersion system, which operates by a laser diffraction technique.

Example 2

The procedure of Example 1 is repeated using an alternative monomer composition i.e. the monomers comprise 50% by weight of sodium acrylate and 50% by weight of acrylamide (Product A of Example 1 contains 35% by weight of sodium acrylate and 65% by weight of acrylamide). This product is referred to as Product B and is prepared in the same way as Product A in Example 1 except that the aqueous monomer phase comprises acrylamide (64.5 g), acrylic acid (49.4 g), sodium hydroxide (27.4 g), water (135.1 g), EDTA solution (40% in water) (0.4 g), and methylene bisacrylamide (0.1% solution in water) (3.2 g). The final product has a viscosity of 1000 cP (Brookfield Viscometer using spindle 3 at 20 rpm) and VMD of 0.72 microns (by the method described in Example 1).

Example 3

Comparative

The procedure of Example 1 is repeated using the aqueous monomer phase and solvent phase as given below. An aqueous monomer phase is prepared from acrylamide (83.7 g), acrylic acid (34.6 g), sodium hydroxide (19.2 g), water (138.9 g), EDTA solution (40% in water) (0.4 g), and methylene bis acrylamide (0.1% solution in water) (3.2 g). An oil phase is prepared from di-isodecyl phthalate (172.3 g), Exxsol D40 (108.8 g), Span 80 (2.8 g), and a polymeric stabiliser (as Example 1) (12.2 g). The polymerisation is allowed to free rise to approximately 80° C. over an hour. Water and Exxsol D40 are then removed from the emulsion by vacuum distillation using a thin film evaporator at 140° C. Ethylan 55 is added at a rate of 5 g Ethylan 55 per 100 g of distilled dispersion. The product is referred to as Product C. Product C is similar to Product A produced in Example 1, but has a higher mean particle-size, with a VMD of 2.97 microns. The viscosity is 650 cP (measured as in ex. 2).

Example 4

A polyvinyl chloride (PVC) composition is prepared with Product A from Example 1, according to formulation below.

| | |
|---|---|
| PVC suspension homopolymer: | 45.1 parts by weight |
| Processing aid: | 2.7 parts by weight |
| External lubricant: | 0.2 parts by weight |
| Ca/Zn stabilizer: | 0.5 parts by weight |
| Epoxidised soya bean oil (ESBO): | 4.5 parts by weight |
| Di-isodecylphthalate (DiDP): | 1.8 parts by weight |
| Product A: | 45.2 parts by weight |
| (Total): | (100 parts by weight) |

The 45.2 parts by weight of Product A comprises approximately of:

| | |
|---|---|
| Di-isodecylphthalate (DiDP): | 23.4 parts by weight |
| Copolymer: | 18.1 parts by weight |
| Other: | 3.7 parts by weight |

(Other = Polymeric stabilizer, primary emulsifier, activator and initiator residues.)

The PVC suspension homopolymer is EVIPOL® SH6520 supplied by EVC (European Vinyls Corporation) having a K-value of 35. The processing aid is VINURAN® 3833 (a copolymer based on acrylic and methacrylic esters, K-value: 105-120 from BASF). The external lubricant is a N,N'-ethylene distearamide (MARKLUBE® 280 from Crompton). As Ca/Zn stabilizer Lankromark® LZC749 (Akcros Chemicals, specific gravity 0.97 g/cm$^3$, flash point (Pensky Martens closed cup) of above 100° C., containing zinc tallate and trisnonylpehyl phosphite) is chosen. As epoxidized soya bean oil Lankroflex® E2307 (AKZO NOBEL, specific gravity 0.990 g/cm$^3$, refractive index of 1.473) is used.

The following method is used: PVC suspension homopolymer is firstly added to a stainless steel mixing bowl. The other ingredients (excluding diisodecyl phthalate and polymer) are added one at time, in the order listed above, over a period of approximately 5 minutes using a Kenwood Major Classic KM800 mixer. The diisodecyl phthalate and polymer are added in stages over 10 minutes with the mixer set at the highest speed possible, ensuring no contents are ejected from the bowl. Finally the whole is thoroughly mixed for 10 minutes.

The mix is then milled on a Schwabenthan 2-roll mill for approx. 6 minutes, with the rear roll set at a temperature of 150° C. (speed 25 rpm) and the front roll set at a temperature of 160° C. (speed 30 rpm). The nip ranges from 0.3 mm to 1.5 mm, with adjustment within this range as required to form a sheet on the front roll with sufficient strength to be cut from the roll. Throughout this procedure the PVC is cut from the front roll and fed back into the nip several times to help produce a homogenous sheet. Finally the PVC in the form of a sheet is removed from the front roll.

The sheet is allowed to cool and then cut into squares and placed in a mould consisting of a stainless steel frame of internal dimensions 15.4 cm×15.4 cm×0.5 cm in depth sat on a polished metal plate. The mould is filled to the point at which there is an excess of PVC sheet relative to the capacity of the mould. A second metal plate is placed over the upper side of the mould such that the mould is sandwiched between the two metal plates (polished sides facing the PVC). The mould is placed on the lower platen of a heated press (Bradley & Turton) at a temperature of approx. 165-170° C. for one minute. A weight of 70 to 75 tons, equivalent to a pressure in the range of 29 to 31 MPa is then applied for one minute before cooling the platens. Pressure is maintained until the point at which the platen temperature falls below 120° C. At 50° C. the mould is removed and the PVC plaque is separated from the plates.

4 cm long×2 cm wide specimens are cut from the PVC plaques. These are immersed separately in bottles containing deionised water and the increase in weight recorded after a 20-day period. From this the percentage swell by weight is calculated as follows:

$(W_f - W_o)/W_o \times 100$ $W_o$=original (dry state) weight
$W_f$=final (water conditioned state) weight The water in which the PVC specimen is immersed is visually assessed for signs of hydrophilic polymer lost from the PVC specimen.

Example 5

A polyvinyl chloride (PVC) composition is prepared with Product B from Example 2 using the procedure as in Example 3. The PVC specimen is tested in the same way as described in Example 3.

Example 6

Comparative

A polyvinyl chloride (PVC) composition is prepared with Product C from Example 3 using the procedure as in Example 3. The PVC specimen is tested in the same way as described in Example 3.

Example 7

Comparative

An aqueous monomer phase is prepared from acrylamide (84 g), acrylic acid (27.6 g), sodium hydroxide (15.3 g), water (269.5 g), EDTA solution (40% in water) (0.4 g), and methylene bisacrylamide (0.1% solution in water) (3.2 g). The aqueous monomer is cooled to 0° C. and sparged with nitrogen for 30 minutes. A thermal initiator, 4,4-azo bis(4-cyanovaleric acid), 0.2 g is added followed by redox initiators, t-butyl hydroperoxide (1% solution in water) 0.4 g and sodium sulphite (1% solution in water) 0.8 g. The polymerisation is allowed to exotherm to approximately 80° C. and maintained at this temperature for 2 hours.

The gel polymer is cut into approximately 2 mm size pieces and dried in a hot air stream. The dried polymer is ground into a powder and passed through a 75 micron sieve. The powder collected comprised 95% of a 70:30 acrlyamide:sodium acrylate copolymer with 5% water and is hereafter called Product D. A sample of Product D is analyzed by Scanning Electron Microscopy and the particle size is ranging from 5 to 75 microns. The particles are of an irregular shape; hence, the quoted particle-size is the largest dimension of the particles.

Example 8

Comparative

Example 4 is repeated, except that Polymer D is used, and with the further exception, that different amounts of DiDP and Product D are used. The PVC specimen is tested in the same way as described in Example 3.

The composition is as follows:

| | |
|---|---|
| PVC suspension homopolymer: | 45.1 parts by weight |
| Processing aid: | 2.7 parts by weight |
| External lubricant: | 0.2 parts by weight |
| Ca/Zn stabilizer: | 0.5 parts by weight |
| ESBO: | 4.5 parts by weight |
| Di-isodecylphthalate: | 28.9 parts by weight |
| Product D: | 18.1 parts by weight |
| (Total) | (100) parts by weight |

Example 9

Comparative

Example 7 is repeated, except that the powder is obtained by sieving through 90 micron and 75 micron sieves, i.e. size fractions are in the range of 75 to 90 microns. This is referred to as Product E.

Example 10

Comparative

Example 8 is repeated, except that Product E is used.

Example 11

Comparative

Example 7 is repeated, except that the powder is obtained by sieving through 250 micron and 150 micron sieves, i.e. size fractions are in the range of 150 to 250 microns. This is referred to as Product F.

Example 12

Comparative

Example 8 is repeated, except that Product F is used.

Results for Examples 4, 5, 6, 8, 10 & 12

| Example | Hydrophilic Polymer Sample | Hydrophilic Polymer VMD | % Swell (by weight) | PVC Retention of Hydrophilic Polymer |
|---|---|---|---|---|
| Example 4 | Product A (35% sodium acrylate) | 0.70 microns | 136.4 | Good |
| Example 5 | Product B (50% sodium acrylate) | 0.72 microns | 145.8 | Good |
| Example 6 | Product C (35% sodium acrylate) | 2.97 microns | 24.0 | Good |
| Example 8 | Product D | 5-75 microns* | 5.6 | Moderate |
| Example 10 | Product E | 75-90 microns* | 5.4 | Moderate to Poor |
| Example 12 | Product F | 150-250 microns* | 3.8 | Poor |

*Particle-size not directly comparable to particle-size of Products A, B and C, but serves to illustrate gross differences.

Example 13

An aqueous monomer phase is prepared from acrylamide, 83.7 g, acrylic acid, 34.6 g, sodium hydroxide, 19.2 g, water, 138.9 g, EDTA solution (40% in water) 0.4 g, and methylene bis acrylamide (0.2% solution in water) 3.5 g. An oil phase is prepared from Exxsol D100 45 g, Exxsol D40, 234.4 g, Span 80, 8.4 g, and a polymeric stabiliser (stearyl methacrylate:methacrylic acid copolymer 23% solution in Exxsol D40), 12.2 g. The monomer and oil phases are mixed together using a Silverson Homogeniser such that aqueous monomer droplets with an average size of less than 2 microns are formed. This unpolymerised emulsion is transferred to a 1 L reaction flask fitted with nitrogen inlet, stirrer and initiator feed inlets. A nitrogen purge is applied for 30 minutes and a nitrogen blanket is maintained thereafter. The temperature of the unpolymerised emulsion is adjusted to 20° C. Polymerisation is initiated by the addition of both t-butyl hydroperoxide and sodium metabisulphite. The polymerisation is allowed to free rise to approximately 85° C. over an hour. Water and Exxsol D40 are then removed from the emulsion by vacuum distillation using a rotary evaporator at 100° C. An "activator" (inverting surfactant, 3:2 Synperonic A4/Ethylan TU) is added at a ratio of 5 g activator to 100 g of the distilled product. The volume mean diameter (VMD) of the thus obtained reverse phase dispersion is 1.0 microns, as measured by a Sympatec Helos 1539 with R1 lens and Quixel dispersion system. The viscosity of this dispersion is 11500 cP using a Brookfield RVT viscometer, with spindle 6 at 20 rpm and at 20° C.

The polymer is separated from the reverse phase dispersion in the following manner: 250 g of the above dispersion is mixed with 100 g of a heavy paraffin oil (Solvent Neutral® 150 from Cepsa). This is added to three liters of acetone mechanically stirred to maintain a good vortex throughout. After 2 minutes the stirrer is switched off and the solids are allowed to settle out. The whole is filtered through a Buchner funnel (fitted with Whatman 541 hardened ashless filter paper).

The damp solids are dried, grinded, washed with 750 ml of fresh distilled acetone, filtered and finally dried in a warm fan-assisted oven. The thus dried solids are broken up using a pestle and mortar to give a flowable, granular powder.

The final product is analysed by Scanning Electron Microscopy and found to contain aggregates of primary particles. The aggregates are observed to be less than 200 microns and the primary particles less than 2 microns.

Example 14

An EPDM (ethylene propylene diene monomer) rubber composition is prepared containing 44.5% by weight of the microparticulate polymer powder from example 13, according to the formulation below.

| | |
|---|---|
| EPDM | 37.9 parts by weight |
| Carbon Black | 11.4 parts by weight |
| Process oil | 3.8 parts by weight |
| Peroxide | 1.9 parts by weight |
| Activator | 0.5 parts by weight |
| Polymer of ex. 13 | 44.5 parts by weight |
| (Total) | (100) parts by weight |

The EPDM is Vistalon® 7000 (ethylene content of 71-74% by weight, Mooney viscosity of 55-65 and ENB type of terpolymer) supplied by Exxon Chemical. The carbon black is FEF® N550. The process oil is Strukpar® 2280 (paraffinic type). The peroxide is Perkadox® 14/40 (1,3-Bis-(tert butyl-peroxy-isopropyl) benzene). Activator is Activator®OC (triallylcyanurate).

The following method is used. EPDM rubber is firstly added to a 1.57 liter Laboratory Banbury Internal Mixer (set at 35° C. and ram pressure of 430 kPa (60 psi)). The powder of example 13 is added in 3 stages over a 7-hour period. After a further hour is added the carbon black, an hour later the process oil and then 2 hours later the mix is sheeted out onto a cool clean 22.86 cm×45.72 cm (9"×18") two roll mill. The peroxide and activator are added and blended in fully. The mix is finally refined by passing it through a tight nip 6 times. The compound is sheeted off and allowed to cool. The sheet is then compression moulded at 160° C. for 69 minutes to give a 5 mm thick plaque.

The plaque is cut to expose a fresh surface, which is analysed by Scanning Electron Microscopy. Clearly visible in the matrix of the rubber are the polymer microparticles of hydrophilic polymer. The primary particles are no longer in large aggregates, instead they are present as individual particles.

4 cm long×2 cm wide specimens are cut from the EPDM plaque. These are immersed separately in bottles containing deionised water and the increase in weight recorded after a 20-day period. From this the percentage swell by weight is calculated as described in ex. 4 to be 376% after 20 days.

EPDM rubber without any hydrophilic polymer is found to have zero swell.

The invention claimed is:

1. A water-swellable composition obtained by combining a non-water-swelling thermoplastic or elastomeric polymer and a water-swelling material, comprising
   (a) from 5 to 70% by weight of hydrophilic polymer microparticles,
   (b) from 30 to 95% by weight of a water-insoluble thermoplastic polymer, resin or elastomeric material,
   wherein the hydrophilic polymer microparticles have a particle volume mean diameter of not more than 2 micron (as determined by laser diffraction technique using a Sympatec Helos H1539 with R1 lens and Quixcel dispersion system).

2. A polymer microparticle obtained by a reverse phase polymerization of
   (aa) water-soluble, ethylenically monounsaturated polar nonionic monomers and
   (ab) water-soluble, ethylenically monounsaturated anionic monomers,
   in the presence of a crosslinker, wherein the polymer microparticles have a volume mean diameter of not more than 2 microns (as determined by laser diffraction technique using a Sympatec Helos H1539 with R1 lens and Quixel dispersion system).

3. The process of obtaining the composition of claim 1 comprising admixing 5 to 70% by weight of hydrophilic microparticles and 30 to 95% by weight of water-insoluble thermoplastic polymer, resin or elastomeric material.

4. A method of manufacturing a seal by forming the compositions according to claim 1.

5. Seals comprising the compositions according to claim 1.

6. Seals according to claim 5, wherein the seal is a swellable waterstop.

7. A method of manufacturing a seal by combining a non-water-swelling thermoplastic or elastomeric polymer and a water-swelling material, comprising
   (a) from 5 to 70% by weight of hydrophilic polymer microparticles obtained by a reverse phase polymerization of
      (aa) water-soluble, ethylenically monounsaturated polar nonionic monomers and
      (ab) water-soluble, ethylenically monounsaturated anionic monomers, in the presence of a crosslinker, wherein the polymer microparticles have a volume mean diameter of not more than 2 microns (as determined by laser diffraction technique using a Sympatec Helos H1539 with R1 lens and Quixel dispersion system)
   (b) from 30 to 95% by weight of a water-insoluble thermoplastic polymer, resin or elastomeric material,
   wherein the hydrophilic polymer microparticles have a particle volume mean diameter of not more than 2 micron (as determined by laser diffraction technique using a Sympatec Helos H1539 with R1 lens and Quixel dispersion system).

* * * * *